United States Patent
Cohen et al.

(10) Patent No.: US 6,502,999 B1
(45) Date of Patent: Jan. 7, 2003

(54) OPTO-ELECTRONIC TRANSCEIVER MODULE AND HERMETICALLY SEALED HOUSING THEREFORE

(75) Inventors: Mitchell Simmons Cohen, Bedford, MA (US); David Peter Gaio, Rochester, MN (US); William K. Hogan, Rochester, MN (US); Steven Paul Ostrander, Wappingers Falls, NY (US); Sudipta Kumar Ray, Wappingers Falls, NY (US); Jeannine Madelyn Trewhella, Peekskill, NY (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/946,053

(22) Filed: Sep. 4, 2001

(51) Int. Cl.⁷ .............................. G02B 6/36; G02B 6/00
(52) U.S. Cl. ............................ 385/94; 73/115; 385/147
(58) Field of Search .............................. 385/88–95, 147; 73/115, 705, 714, 715, 716, 756

(56) References Cited

U.S. PATENT DOCUMENTS 5,763,769 A * 6/1998 Kluzner ........................ 73/115

FOREIGN PATENT DOCUMENTS

| DE | 3639881 A | * 6/1998 | ............. H01S/3/04 |
| EP | 191328 A | * 8/1986 | ............. G02B/6/42 |
| EP | 336156 A | * 10/1989 | ............. G02B/6/42 |
| EP | 337141 A | * 10/1989 | ............. G02B/6/42 |

* cited by examiner

Primary Examiner—Akm E. Ullah
(74) Attorney, Agent, or Firm—Allen, Dyer, Doppelt Milbrath & Gilchrist, P.A.

(57) ABSTRACT

An opto-electronic module is housed in a hermetically sealed housing which is fabricated on a base member of solderable material to which a side wall structure is soldered. A cover is similarly provided that either is soldered to the top open end of the housing at the edge of the housing wall structure or is a cup-shaped member that slides over the wall structure and is soldered at the juxtaposed faces of the walls of the cover and the wall structure. Overlapping slots co-align to form a passage through which optical fibers may pass through the walls. The hermetic seal of the housing prevents the internal contamination of the module by water vapor, particulate matter or other contaminants.

18 Claims, 4 Drawing Sheets

OPTO-ELECTRONIC TRANSCEIVER MODULE AND HERMETICALLY SEALED HOUSING THEREFORE

FIELD OF THE INVENTION

This invention relates generally to optical data communication devices and, more specifically, may relate to optical signal transceiver units that transmit and receive optical signals in digitized form in order to share data and/or communicate that data between computers and servers, over routers, switches and networks.

BACKGROUND OF THE INVENTION

Opto-electronic devices such as photo-detectors and lasers convert signals between optical and electronic forms. Opto-electronic transceivers that generate and receive digital optical signals in computers, servers, routers or switches are essential sub-assemblies of such communications systems. Opto-electronic transceivers are assemblies of optical, electronic and opto-electronic components. The opto-electronic devices in the transceivers create and receive digital optical signals under electronic signal control by converting electronic signals into digital optical signals for transmission over fiber optic cables and networks; these devices also function by receiving and converting digital optical signals into electronic digital signals for use by the host computers, servers, routers or switches. Inasmuch as the size of the components of a transceiver assembly is very small in a transceiver assembly, a controlled environment is mandatory for components within which to exist and operate efficiently and reliably.

A transmit optical subassembly or TOSA typically comprises, at least, a minimum of a solid-state laser device and a light transmission conductor along with conventional data signal electronic control circuits. These circuits control and drive a solid-state laser in order to generate light pulses under an electronic control. The receive optical subassembly or ROSA, at a minimum, is similarly constituted of a photo-detector and a light transmission conductor together with electronic circuits necessary both to convert the output of a photo-detector into usable electronic data signals and to transmit and condition the output signals of a photo-detector. The photo-detector output signals are generated by light pulses impinged on the detection surface of a photo-detector by an associated light transmission conductor.

Typically, optical data signal conductors are optical fibers. The digital light signals are conducted into and out of a transceiver assembly by very small optical fibers, in the order of 8–10 microns in diameter. Similarly, the exit or the light projection aperture of a solid-state laser is commensurately small. The photo-detector detection surface may be larger so that all of the light of the incoming digital signal impinges on the detection surface, thereby insuring reliable reception of the optical signals. With the diameter of an optical fiber being 8–10 microns, the placement of and quality of the pulses of light are critical. Light signals must not be attenuated or degraded by contaminants on any of the optical fiber end faces, surfaces of lenses, surfaces of reflection suppressors, faces of the opto-electronic components, or in the atmospheric light path.

Very significant efforts are made to create extremely accurate alignments of the optical elements of the system. In more enhanced systems, the digitized optical signal may be passed through one or more lenses and an anti-reflection isolator, and then may be reflected off angled surfaces on the end of an optical fiber to direct, control and position the light pulses properly relative to other optical elements of the system.

Contaminants introduced into or allowed to enter the internal environment of a transceiver module may include dust particles, water vapor or condensate, dust, fumes, smoke or other pollutants. Such contaminants may reduce the light signal transmission strength sufficiently to render the transceiver unreliable in either or both the "transmit" or "receive" modes of operation.

One micron particles of dust, debris or other contaminants that settle on or are attracted to the optical surfaces, which coat or block even a portion of the light path, will greatly diminish the optical strength of a signal passing to or from the opto-electronic element. Similarly, if there are lenses or other optical elements in the light path, each of these optical elements may collect dust, particulate contamination, moisture, or a film of contamination on any or all the optical surfaces thereof, and thus prevent the efficient passage of light therethrough.

Lasers are very sensitive to moisture; moreover, reflective coatings on facets of some types of lasers, such as a DFB (distributed feedback) laser, are sensitive to condensed moisture as the condensate acts to interfere with the passage of the laser signals therethrough.

With the use of an hermetic seal on the container of the opto-electronic unit, final assembly of the unit may be a accomplished under very controlled humidity conditions. By eliminating the possibility of moisture in the TOSA or the ROSA, the laser is protected and reliability is increased.

Accordingly, in order to exclude all contaminants, the environment within which a transmit optical subassembly (TOSA) or receive optical subassembly (ROSA) operates must be closely controlled during manufacture and assembly periods. The module or containment structure which encloses the TOSA and ROSA must block and prevent introduction of contaminants to prevent internal contamination after assembly in order to assure reliable operation that has been designed into the TOSA or ROSA by means of very precise placement of the optical and opto-electronic components within the transceiver module. Otherwise, contamination of the transceiver module interior reduces or destroys benefits of the efforts to establish and maintain accurate alignment of the various optical and opto-electronic components of the assembly.

OBJECTS OF THE INVENTION

It is an object of the invention to control the environment within an opto-electronic module.

It is a further object of the invention to exclude and prevent all contaminants from entering the internal environment of an opto-electronic module.

It is another object of the invention to prevent debris or contaminants from interfering with the proper operation of the optical devices of an opto-electronic module. It is a still further object of the invention to hermetically seal the exterior container structure of an opto-electronic module.

Other Objects of the Invention will become apparent to one of skill in the art upon acquiring a complete understanding of the invention The foregoing Objects of the Invention are exemplary and not intended to be limiting of the scope of the invention in any manner.

The above described drawings are provided for the purpose of illustrating the invention and its various embodiments and are illustrative of the best mode of the preferred embodiment of the invention and, as such, are not intended to limit the scope of the invention in any manner.

DETAILED DESCRIPTION OF THE BEST MODE OF THE PREFERRED EMBODIMENT OF THE INVENTION

AS CONTEMPLATED BY THE INVENTORS

Figure 1:
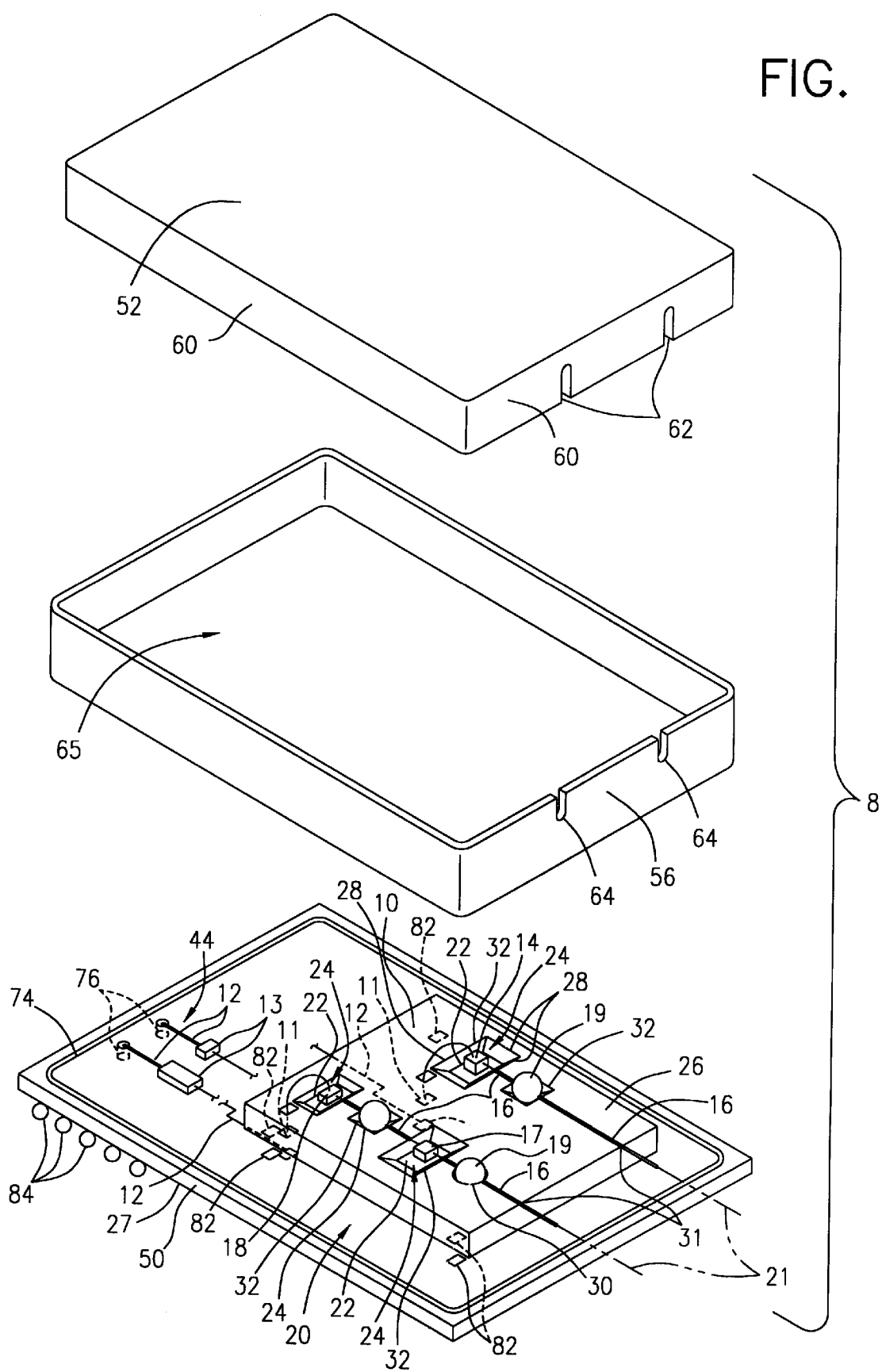
FIG. 1 is an exploded isometric illustration of a module illustrating the present invention.

Referring initially to FIG. 1, a support member 10 or bench 10 is illustrated. During manufacture of a larger opto-electronic assembly 8, bench 10 serves as a component advantageously used to precisely position and support electronic, optical and opto-electronic devices which require precise placement relative to other components.

Because precision in the manufacture of the bench 10 and placement of the opto-electronic and optical components is very essential to ensure adequate optical signal strength being sent and received, any contamination of the optical or opto-electronic components of the system may significantly or totally eliminate the advantages of the support bench 10.

Bench 10 is preferably a plate or block of silicon particles which has been formed and fired to fuse the silicon particles; such a technique is well-known in the art of integrated circuit manufacture. Alternatively, bench 10 may be made from silicon crystals. A fused block of silicon particles or a silicon crystal slab forming the body of bench 10 is dense, rigid and electrically insulative. Bench 10 is also a very good receptor of an electrically conductive circuit pattern 11 to be formed upon the surfaces thereof. The conductive electronic circuit pattern 11 may be either plated and etched, or selectively vapor-deposited onto some selected areas of surface 26 of bench 10. Electronic circuit pattern 12, necessary to power, control and operate opto-electronic components 14, 18 of the opto-electronic module 8 and to communicate the incoming and outgoing data stream to and from the opto-electronic module 8, is typically deposited on the top surface of base 50. The base circuit pattern 12 may be solder interconnected to bench circuit pattern 11 using conductive vias or connected through wire bonds.

A silicon bench 10 is well-known to be thermally stable in that internally generated heat within module 8 will not cause a physical shift in the relative positions of components attached thereto due to thermal expansion of the various materials.

A silicon bench 10 may be advantageously precision shaped to accept optical components 16, 17, 19 and opto-electronic components 14, 18 of an opto-electronic communications system or subassembly thereof, such as transceiver module 8. Advantageously disposed on and attached to bench 10, in even the simplest form of an opto-electronic sub-assembly 20, components 14, 16, 18, 19 may include a solid-state laser 14, optical fibers 16, a photo-detector 18, and/or one or more spherical lenses 19. If desired or beneficial, additional optical components, such as an reflection suppression device 17, may be used in the optical portion of the opto-electronic assembly as will be more fully described below.

Figures 2, 3:
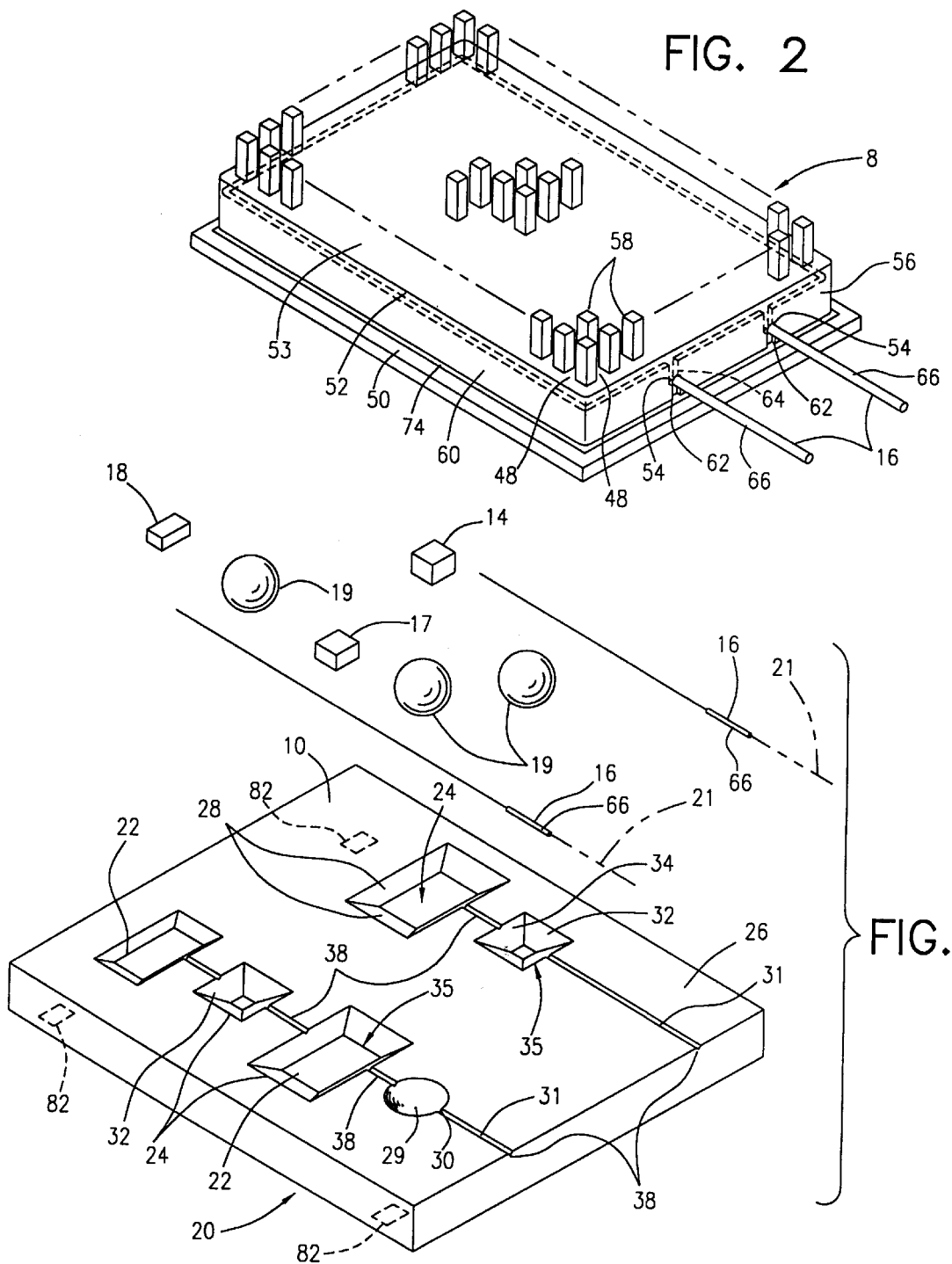
FIG. 2 is an isometric view of a transceiver module fully assembled wherein the cover closure is a metal cover with side walls and is provided with a plurality of heat dissipation pins projecting from the exposed major surface of the cover.
FIG. 3 is an exploded isometric portray of an exploded typical opto-electronic module of the type that may be advantageously enclosed within the present invention.

In FIG. 3, an illustration of details of bench 10 is presented. Bench 10 supports a series of optical and opto-electronic elements or components 14, 16, 17, 18,19 in various combinations aligned so that the optical axis of each of the components 14, 16, 17, 18, 19 lies along a common optical axis 21. Bench 10 acts as an alignment tool or fixture as well as a support member in order to achieve precision component placement in order to insure minimal optical signal loss or optical signal attenuation as light passes through each optical or electro-optical component 14, 16, 17, 18, 19 and serially between the various components.

Preferably, the laser 14 is supported by and attached to a planar surface 22 within a cavity, depression or well 24. The well 24 is a cavity or chamber 24 formed into one of the surfaces 26 of the silicon bench 10. The sides 28 or walls 28 of the well 24 are sloped in a converging fashion, and the bottom or floor surface 22 is planar in form and parallel to surface 26. The well 24 may advantageously be formed into the bench 10 by acid etching, a well-known process in the electronic chip and circuit making art. Acid etching is an advantageous technique for precision fabrication of devices like bench 10. The technique lends itself to precision placement of small opto-electronic devices 14, 18 and particularly optical components 16, 17, 19 without the need to employ specialty placement tools.

Due to design power restrictions and component size, the signal strength of the optical data signal is very small and, therefore, great efforts must be made to prevent the attenuation of the optical signal strength. Optical signal strength attenuation may be caused by contamination within an opto-electronic assembly 20 by dust particles, debris and/or the deposit and condensation of vapors on any surfaces within the module 8. Component placement of the optical and opto-electronic portion of the device and, specifically, the optical components such as lenses 19 and optical fibers 16 is critical to insure both proper light axis alignment and preservation of the optical signal strength to the maximum extent possible. The same importance applies to the relative placement of the opto-electronic components 14, 18 relative to the optical fibers 16, anti-reflection device 17 and lenses 19. If there is marginal optical signal strength due to lack of proper alignment and placement of the various components 14, 16, 17, 18, 19, contamination of the optical surfaces thereof will rapidly degrade optical signal strength well below acceptable levels.

Referring to bench 10, the etching rate of the silicon by the etching acid determines the slope of the walls 28 of the depressions or wells 24. The slope of the walls 28 is constant. The bench 10 is submerged in an etching acid bath and etching progresses on the silicon exposed by openings in a mask formed on a surface of the bench 10. Material surrounding the initial etch site is etched and removed, not only in an inward but also in a lateral direction from the exposed surface of the bench 10, starting at the aperture or opening in the masking material (not shown). Thus, the mouth 32 of well 24 is wider than the width of deeper portions or floor 22 of the well 24. The dimensions of the well 24 may be very closely controlled by monitoring the etching time and other etching parameters.

Figure 5:
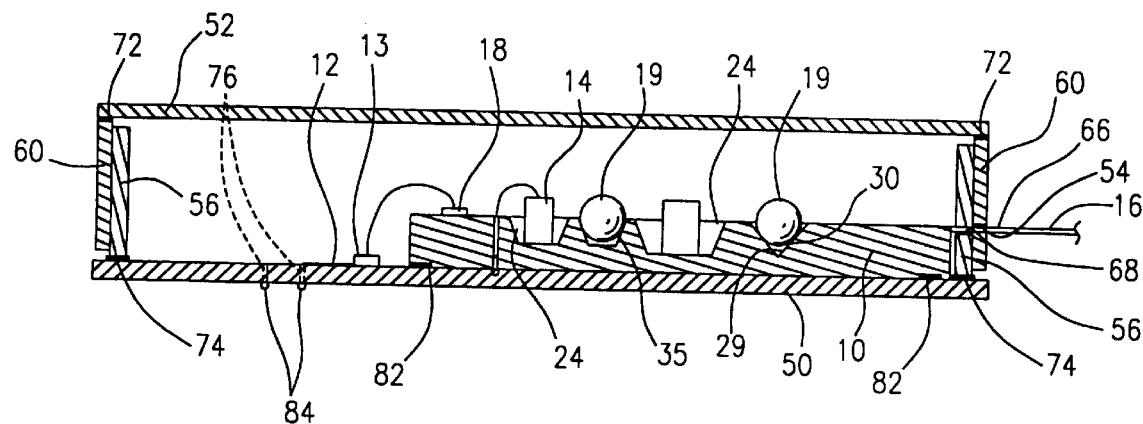
FIG. 5 is a side-section view of the module of FIGS. 1 and 2 embodying the invention.

Various shaped depressions may be formed in the silicon block 10 or bench 10 as illustrated in FIGS. 1, 3 and 5. A small square or rectangular exposed portion of the silicon block 10 or the bench 10 will result in a well 24, such as that shown, having sloping side walls 28 and a planar floor 22. Similarly, a very small hole in the mask, circular in shape, will yield a conical depression 30 with its sides 29; a larger hole will result in a frustro-conical depression with a planar floor (not shown). Similarly, a narrow cut or discontinuity in the masking layer will result in an etched V-shaped trough 38, having sides 31. A small square hole in the mask will result in a frustro-pyramidal depression 35 which has sides 34. To define the etch sites on the bench 10, a masking material is applied to the exterior of the bench 10 and exposed to an acting light source to define the openings in the mask (not shown) in a conventional and well-known manner which does not need to be further disclosed, described or discussed.

By defining the dimensions and shapes of openings in a mask and the opening sizes in the layer deposited on the silicon block 10 prior to etching, the width and depth of the depressions 24, 30, 35, 38 for a predetermined etching process, the shape and dimensions of the V-channel or trough 38, the conical depression 30, inverted frustro-pyramidal depression 35, and well 24 are each defined and controlled.

Spherical lenses 19 and anti-reflective optical elements 17 may be positioned in and by the depressions 30, 35 or wells 24, respectively, aligning the optical axis 21 of each optical element with the light path as a result of the depth and shape of the respective depressions 30, 35, 24.

The well 24 may be advantageously formed to provide a recessed planar surface 22 substantially parallel to surface 26 of bench 10. Surface 22 may support an opto-electronic device such as a laser 14 or other optically responsive device, such as a photo-detector 18, relative to the optical axis 21 of the light path of incoming and outgoing optical signals. Similarly, the optical components 16, 17, 18, in the light path may be positioned with each respective optical axis aligned as a result of precise control of supporting surfaces 22, 28, 31, 29, 34 of the wells 24, troughs 38, conical depression 30, and frustro-pyramidal depressions 35. Thus, an optical fiber 16 can be laid in the V-shaped cross-sectional trough 38 and cemented in contact with sides 31 without sophisticated precision placement equipment inasmuch as the depth and side angles of the sides 31 of the trough 38 define the location of the optical axis 21 of the optical fiber 16.

Similarly, the other supporting services of depressions or wells contact and support components 14, 17, 18, 19 at predetermined depths relative to a datum level.

The conical 30 or inverted frustro-pyramidal depressions 35 may be sized to accept a spherical lens 19. The diameter or dimension at the surface 26 of the opening may be sized by controlling etching time to accurately position the spherical lens 19 with its optical axis at the surface or the same distance below the surface of the bench 10 as the axis of the laser emissions (not illustrated) or the optical axis 21 of the optical fiber 16.

Other surfaces may be etched to control both the surface height above or below a known datum surface, such as surface 26, as well as the relative heights of various optical components 16, 17, 19; and thus, specifically, the optical path of the data light beam (not shown) is controlled so that the light beam is aligned with the common optical axis 21 of the various optical and opto-electronic elements of the system for signal strength and efficiency. The placement of devices such as anti-reflection element 17 may be in a channel or well 24 which could extend across the width of the bench 10.

Figure 6:
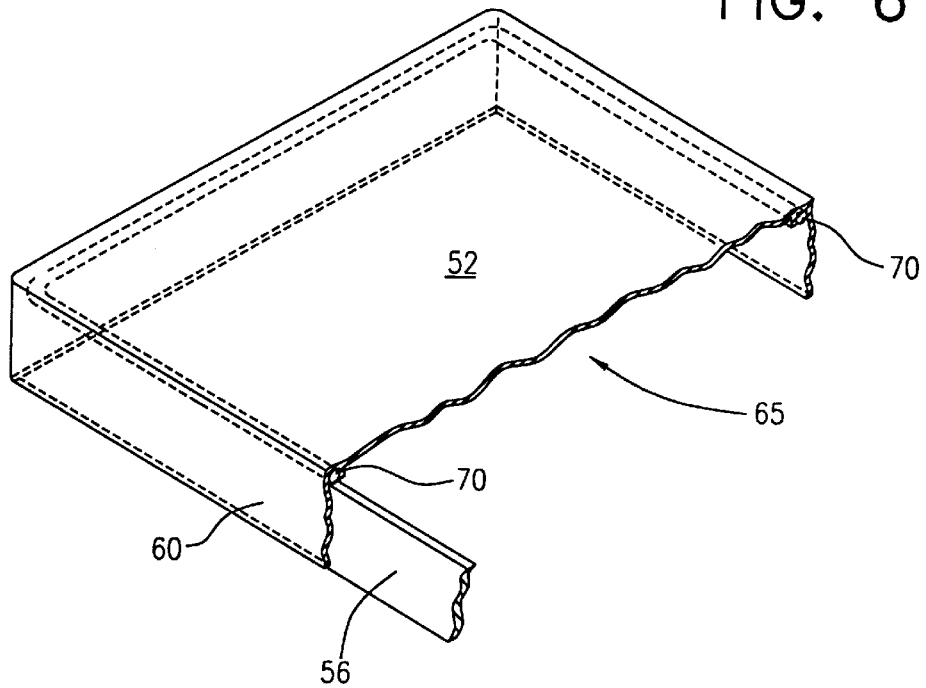
FIG. 6 is a partially broken-away isometric view of a metal cover with a sealing gasket therein.

For a more complete understanding of the hermetic sealing of the modules 8, refer to FIGS. 2, 5 and 6.

Referring to FIG. 2, the cover 52 or the closure plate 52 may be fabricated using a metal plate or metal alloy casting. If adequate cooling is otherwise not possible, the external surface 53 of the closure plate 52 may be provided with cooling pins 58. The pins 58 can be formed as part of a die-casting operation forming the closure plate 52. Alternatively, the pins 58 may be made by cutting kerfs 48 orthogonally in the metal forming the surface 53 of closure plate 52 and leaving pins 58 projecting therefrom.

Figure 4:
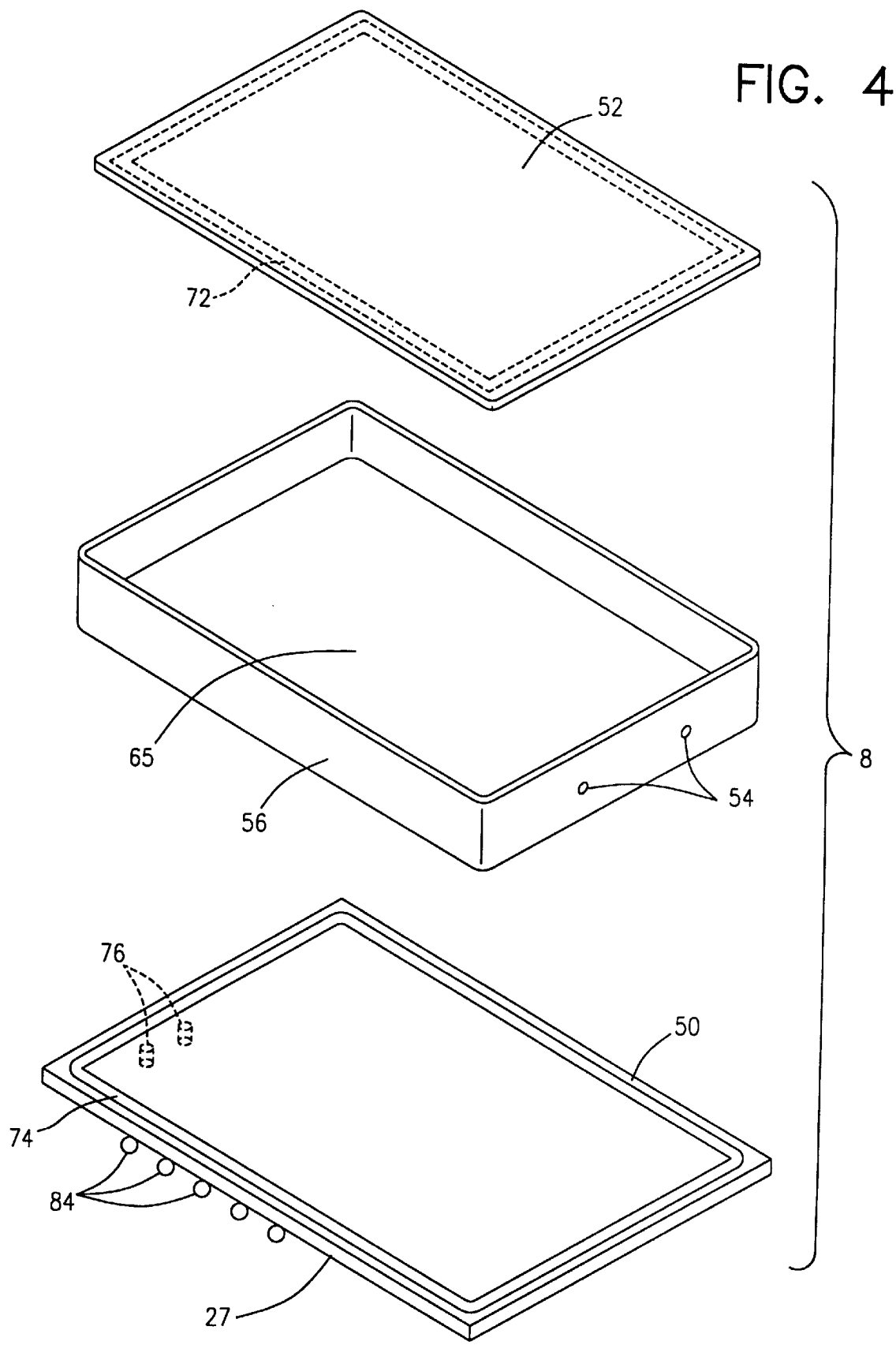
FIG. 4 is a perspective view of the module housing having both a ceramic base and a ceramic closure, illustrating the implementation details of the invention.

As illustrated in FIG. 2, the bench 10 may be formed and etched as a structure separate from the base sheet 50 or closure plate 52 of a module 8 containing and including the bench 10, as shown in FIG. 1. Bench 10 is then mounted on the base sheet 50 or closure plate 52. Alternatively, if advantageous or desired, the base sheet 50 or closure plate 52 may be fabricated out of fused silicon or ceramic, be an integral part of the bench 10, and form a single structure within an etched bench 10 portion. If the closure plate 52 is formed to include pins 58 or posts 58 projecting from the exposed surface 53 of closure plate 52, the closure plate 52 preferably is made from a highly heat conductive metal in order to be an effective heat dissipater. A ceramic base 50 is provided with a region extending around the periphery of the base 50 that is metalized with a solderable metal band 74, as shown in FIG. 4.

Great efforts are expended to insure the effective and efficient use of the light beam and optical digital data signals because the signal strength is relatively weak or small. In order to prevent any further reduction or degradation of an optical signal strength over and above normal and inherent transmission losses in signal strength, the internal environment of an opto-electronic module 8 must be established as uncontaminated and clean as possible, then sealed to prevent future contamination; such contamination could attenuate or block the passage of optical data signals through the various components 14, 16, 17, 18, 19.

After assembly, hermetically sealing the containment device or module 8 becomes the solution to the problem of maintaining the cleanliness and freedom from contamination within an opto-electronic module, such as a transceiver module 8. Hermetic seals are not difficult to accomplish if the sealing only involves the attachment of a cover plate 52 to a container. However, whenever there must be ports 54 or passages 54 through the walls 56 of the container or module 8, as in FIGS. 2 and 5, this becomes a more difficult problem to overcome and one that emphasizes the importance of maintaining a contaminant free environment.

Referring to FIG. 2, at least one wall 56 of the opto-electronic module 8 may be provided with a hole 54 or port 54 for each optical fiber 16 that must extend through it. A closure plate 52 may be formed with a sidewall 60 or flange 60 extending from each edge of the cover plate 52. If the module 8 is designed to be closed by a closure plate 52, slots 62 may be cut or formed in the wall 60 of the closure plate 52 to align with similar slots 64 in a wall 56 of the module 8 to form holes 54, as shown in FIGS. 1 and 2. Alternatively, the holes 54 may be punched or drilled through the wall 56 of the module 8 as shown in FIG. 4. Thus, at least one wall of an assembled opto-electronic module 8 is provided with a hole 54 therethrough for the insertion and passage of an optical fiber 66 as shown in FIGS. 2, 4 and 5.

With reference to FIGS. 2, 3 and 5, each individual optical fiber 16 may be provided with a metal outer surface 66 or layer 66 of solderable metal. Surface 66 is preferably a metal such as copper, brass or other solderable metal but could be metalized ceramic or another suitable structural material compatible with the metalized area and capable of being soldered to other solderable surfaces. With an optical fiber 16 resident in port 54, the outer metalized surface 66 of the optical fiber 16 is closely disposed to the portion of wall 56 or wall 56, 60 that defines part of the port 54. Solder may be melted and deposited in the small gap 68 between the outer surface 66 of the optical fiber 16 and the edge of the wall 56 which defines port 54, thereby effectively sealing the gap 68. This soldering may be accomplished along with a step of soldering the side walls 56 to closure side walls 60.

With the wall 56 soldered to a ceramic base sheet 50 and an optical fiber 16 soldered to the wall 56, the only other opening into the module 8 through which contaminants may be introduced or migrate into the interior of module 8 is the opening 65 opposite the ceramic base sheet 50. The cover plate 52 may be provided with a sealing member such as an "O" ring 70 or gasket 70, as shown in FIG. 6, disposed to engage an edge of walls 56 around an opening 65 formed by the wall 56 of the module 8, or the cover plate 52 may be soldered to the walls 56 sealing the chamber within the module 8. If a gasket or "O" ring 70 is used, screws or some holding device (not shown) are required to retain the cover plate 52 relative to the remainder of modules 8.

The walls 60 are soldered to the walls 56 at least near the bottom of wall 60 to hermetically seal the container of the module 8

The cover plate 52 may be metal and have short walls 60 which overlap or telescope with the side wall 56 of the module 8, as in FIGS. 1, 2, and 5. Alternatively, the cover plate 52 may be made of a ceramic and be provided with a solderable pattern 72 corresponding in shape to the shape of the edge of the wall 56 of the module 8, such as illustrated in FIG. 4. In either case, the cover plate 52 may be soldered to the module wall 56 to completely seal the module 8.

Referring to FIGS. 1, 4 and 5, a solder ball array 84 on one of the surfaces 27 of the module 8 may be interconnected with circuitry of the host device (not shown) and, particularly, the electronic components 13 of the opto-electronic module 8. This technique is particularly useful for modules 8 incorporating a ceramic base sheet 50 that is soldered to the side walls 56 of the module 8. The ceramic base sheet 50 is preferably formed to include via interconnections 76 between the electronic circuitry of the host device (not shown) and the electronic circuitry 44 within module 8. This technique is well-known for providing connecting conductive electrical paths through multiple layers of a ceramic structure.

The bench 10 is preferably attached to the base sheet 50 of the module 8 for stability and may be so attached using any of various techniques. The bench 10 may be adhesively attached to the base sheet 50, attached by solder connections to the vias 76 in the base sheet 50, or soldered using solder pads 82 on the base sheet 50 and on bench 10; these solder connections are strictly for stability and attachment purposes. Any other conventional technique may be utilized that does not interfere with the operation or function of the electronic, opto-electronic or optical devices within the module 8 while insuring that the bench 10 remains fixed and immobile relative to the base sheet 50 of the module 8.

Base sheet 50 and closure plate 52 thus are joined by a solder connections at the edge of walls 56 and 60 and solderable regions 72 and 74, respectively, circumscribing a region of base sheet 50 and closure plate 52 to be enclosed by walls 56 and 60 to provide stability while at the same time sealing the base sheet 50 to the walls 56 of module 8.

Once the bench 10 and the electronic components 13, opto-electronic and optical components 14, 16, 17, 18, 19 of the opto-electronic subassembly 20 of module 8 are positioned, attached, and bench 10 installed and fixed within module 8, the optical fiber 16 is soldered or potted to the wall 56 of the module 8 to seal the optical fiber passage or port 54 through the wall 56. Cover plate 52 may be attached and soldered or sealed to the remainder of the module 8 to complete the assembly.

The hermetic sealing of the various junctions in the components of the module 8 insures that atmospherically borne contaminants may not be introduced into module 8 after assembly, thereby not degrading nor attenuating the precisely guided, projected and focused data light beam, a result of precision control and fabrication of the bench 10.

While an identical reference numeral may appear in more than one figure of the drawings designating identical items or analogous items and may be described with respect to only one figure, it should be understood that the explanation applies to all the similarly designated items in all figures.

The foregoing Detailed Description of the Invention is set forth to provide a person of ordinary skill in the art with a sufficient understanding to practice the invention; however, the foregoing description of the invention is not intended to limit the invention in any manner.

While various embodiments of the parts of the invention are disclosed, it should be further understood that other aspects of the invention and minor modifications to the invention will become apparent to one of skill in the art, but the minor modifications to the preferred embodiment described herein will not remove the resulting modified device from the scope of the appended claims which define the scope of the invention.

We claim:

1. A hermetically sealed opto-electronic module comprising:

a insulative base member, said base member comprising electrically conductive connections extending through said base member;

said electrically conductive connections sealed to said base member forming a hermetic seal with said base member;

a wall member circumscribing a predetermined area on a first surface of said insulative base member;

a metal layer selectively deposited on said first surface of said base member in a predetermined pattern, said pattern corresponding to the shape of one open side of said wall member;

said wall member defining at least one opening;

a closure closing a second open side of said wall member;

at least one opto-electronic device and electronic circuitry in support thereof disposed within said wall member;

said electronic circuitry electrically connected to at least some of said base member electrically conductive connections;

an optically conductive member extending from said at least one opto-electronic device through said at least one opening;

said optically conductive member sealed to said wall member;

said wall member sealed to said base member;

said closure sealed to said open side of said wall member;

whereby said opto-electronic module is sealed to prevent ingress and egress of air and contaminants.

2. The hermetically sealed opto-electronic module of claim 1 wherein said electrically conductive connections are via connections.

3. The hermetically sealed opto-electronic module of claim 1 wherein said optically conductive member comprises an optical fiber.

4. The hermetically sealed opto-electronic module of claim 1 wherein said optically conductive member further comprises an optical connector.

5. The hermetically sealed opto-electronic module of claim 1 wherein said wall member is metal.

6. The hermetically sealed opto-electronic module of claim 5 wherein said wall member and said base member are rigidly joined together by a solder connection between said metal layer and said wall member.

7. The hermetically sealed opto-electronic module of claim 6 wherein said optical fiber further comprises a metal layer coating and said wall member and said optical fiber metal coating are soldered to seal any gap between said optical fiber and said wall member.

8. The hermetically sealed opto-electronic module of claim 7 wherein said via connections are connected to external circuitry by reflowing a solder ball array.

9. The hermetically sealed opto-electronic module of claim 8 wherein said wall member and said closure are joined by solder at a junction of said wall member and said closure.

10. The hermetically sealed opto-electronic module of claim 8 wherein said wall member and said closure are formed as a unitary member.

11. The hermetically sealed opto-electronic module of claim 8 wherein said wall member and said closure are joined by a permanent sealer applied at a junction of said wall member and said closure.

12. The hermetically sealed opto-electronic module of claim 11 wherein said wall member and said optical fiber are joined by a permanent sealer applied at the junction of said wall member and said optical fiber.

13. The hermetically sealed opto-electronic module of claim 12 wherein said base member comprises a plurality of fired and fused ceramic layers.

14. The hermetically sealed opto-electronic module of claim 13 wherein said base member includes a plurality of via connections extending through said base member and electrically connected to electronic components contained with said module.

15. The hermetically sealed opto-electronic module of claim 3 wherein optical fiber is clad with a metal layer and said wall member and said optical fiber coating are soldered to seal any gap between said optical fiber and said wall member.

16. The hermetically sealed opto-electronic module of claim 15 wherein said wall member and said closure are joined by solder at a junction of said wall member and said closure.

17. The hermetically sealed opto-electronic module of claim 15 wherein said wall member and said closure are joined by a permanent sealer applied at a junction of said wall member and said closure.

18. The hermetically sealed opto-electronic module of claim 17 wherein said wall member and said optical fiber are joined by a permanent sealer applied at the junction of said wall member and said optical fiber.

* * * * *